(12) United States Patent
Schwarz et al.

(10) Patent No.: US 8,011,883 B2
(45) Date of Patent: Sep. 6, 2011

(54) GAS TURBINE ENGINE BLADE TIP CLEARANCE APPARATUS AND METHOD

(75) Inventors: Frederick M. Schwarz, Glastonbury, CT (US); J. Walter Smith, Seneca, SC (US)

(73) Assignee: United Technologies Corporation, Hartford, CT (US)

( * ) Notice: Subject to any disclaimer, the term of this patent is extended or adjusted under 35 U.S.C. 154(b) by 481 days.

(21) Appl. No.: 12/166,720

(22) Filed: Jul. 2, 2008

(65) Prior Publication Data
US 2008/0267769 A1 Oct. 30, 2008

Related U.S. Application Data

(63) Continuation-in-part of application No. 11/253,235, filed on Oct. 17, 2005, now Pat. No. 7,407,369, which is a continuation-in-part of application No. 11/025,435, filed on Dec. 29, 2004, now Pat. No. 7,341,426.

(51) Int. Cl.
*F01D 11/08* (2006.01)
(52) U.S. Cl. .................... 415/173.2; 415/173.4; 415/127
(58) Field of Classification Search .................. 415/127, 415/136, 173.2, 173.4
See application file for complete search history.

(56) References Cited

U.S. PATENT DOCUMENTS

| | | | |
|---|---|---|---|
| 1,823,310 A | 9/1931 | Allen | |
| 2,762,559 A | 9/1956 | Faught | |
| 3,227,418 A | 1/1966 | West | |
| 4,149,826 A | 4/1979 | Torstenfelt | |
| 4,279,123 A | 7/1981 | Griffin et al. | |
| 4,330,234 A | 5/1982 | Colley | |
| 4,354,687 A * | 10/1982 | Holland et al. | 277/413 |
| 4,442,928 A | 4/1984 | Eastman | |
| 4,683,716 A * | 8/1987 | Wright et al. | 60/226.1 |

(Continued)

FOREIGN PATENT DOCUMENTS
FR 2722836 A1 1/1996
(Continued)

OTHER PUBLICATIONS

European Search Report for EP Patent Application No. 06253005.0, dated Sep. 17, 2010.

*Primary Examiner* — Hoang M Nguyen
(74) *Attorney, Agent, or Firm* — Bachman & LaPointe, P.C.

(57) ABSTRACT

A method for controlling blade tip clearance within a gas turbine engine includes a compressor having at least one first rotor assembly, wherein the blade tips in each of at least one first rotor assembly has a mating geometry with at least one of at least one blade seal surfaces, and a clearance distance extending between the blade tips and the blade seal surfaces; a turbine having at least one second rotor assembly, wherein the blade tips in each of at least one second rotor assembly has a mating geometry with at least one of at least one blade seal surfaces, and a clearance distance extending between the blade tips and the blade seal surfaces; providing an actuator selectively operable to move at least one rotor assembly relative to the shroud; providing an electronic engine controller having a control logic for operating the actuator; and moving at least one first rotor assemblies and at least one second rotor assembly relative to the shroud using the actuator at a response rate according to the control logic to alter the clearance distance.

23 Claims, 7 Drawing Sheets

U.S. PATENT DOCUMENTS

| | | | |
|---|---|---|---|
| 5,005,352 A | | 4/1991 | Schwarz et al. |
| 5,056,988 A | | 10/1991 | Corsmeier et al. |
| 5,092,737 A | * | 3/1992 | Lau .......................... 415/173.2 |
| 5,096,375 A | | 3/1992 | Ciokailo |
| 5,104,287 A | | 4/1992 | Ciokajlo |
| 5,330,320 A | | 7/1994 | Mansson |
| 5,330,321 A | * | 7/1994 | Roberts et al. ................ 415/136 |
| 6,652,226 B2 | | 11/2003 | Albrecht, Jr. et al. |
| 7,341,426 B2 | | 3/2008 | Schwarz et al. |
| 2002/0009361 A1 | | 1/2002 | Reichert et al. |

FOREIGN PATENT DOCUMENTS

| | | |
|---|---|---|
| WO | 93/20335 A1 | 10/1993 |
| WO | 00/28190 A1 | 5/2000 |

* cited by examiner

GAS TURBINE ENGINE BLADE TIP CLEARANCE APPARATUS AND METHOD

CROSS REFERENCE TO RELATED APPLICATIONS

This application is a continuation-in-part of prior U.S. patent application Ser. No. 11/253,235, filed on Oct. 17, 2005 now U.S. Pat. No. 7,407,369, which is a continuation-in-part of U.S. patent application Ser. No. 11/025,435 filed on Dec. 29, 2004, which issued as U.S. Pat. No. 7,341,426 on Mar. 11, 2008.

FIELD OF THE DISCLOSURE

The present disclosure relates to gas turbine engines in general, and to blade tip clearance therein in particular.

BACKGROUND OF THE DISCLOSURE

In an axial flow gas turbine engine, air is compressed in a compressor section, mixed with fuel and combusted in a combustor section, and expanded through a turbine section that, via one or more shafts, drives the compressor section. The overall efficiency of such engines is a function of, among other factors, the efficiency with which the compressor section compresses the air and the efficiency with which the turbine expands the products of combustion. The compressor section typically includes a fan and a low pressure compressor driven by a shaft connected to a low pressure turbine in the turbine section, and a high pressure compressor driven by a shaft connected to a high pressure turbine in the turbine section. The high and low compressors are multi-stage, wherein the air flows in the axial direction through a series of rotors and stators that are concentric with the axis of rotation (longitudinal axis).

The stages are arranged in series. Each stage compresses the air passing through the engine and thereby incrementally increases the pressure of the air. The total pressure increase through the compressor is the sum of the incremental pressure increases through each stage, adjusted for any pressure losses. Thus, in order to maximize the efficiency of the gas turbine engine, it would be desirable, at a given fuel flow, to maximize the pressure rise (hereinafter referred to as "pressure ratio") across each stage of the compressor.

For a variety of reasons, including efficiency, it is highly desirable to minimize the clearance between the blade tips of a rotor and the casing surrounding the rotor. Prior art solutions to maintaining blade tip clearance include the use of abradables and active clearance control systems that manipulate the radial position of the casing surrounding the rotor. A problem with an abradable system is that it is not adjustable once the seal is abraded. Once set, the clearance depends solely on the thermal and centrifugal response of the rotor and the casing. A problem with prior art active clearance systems is their response time. Prior art active clearance systems often utilize the flow (or lack of flow) of cooling air as a mechanism to move the casing via thermal expansion or contraction and thereby achieve the desired clearance. Such systems are still subject to the casing's thermal response time, and the mismatch of the casing's thermal response to the rotor disk's thermal response.

Figure 1:
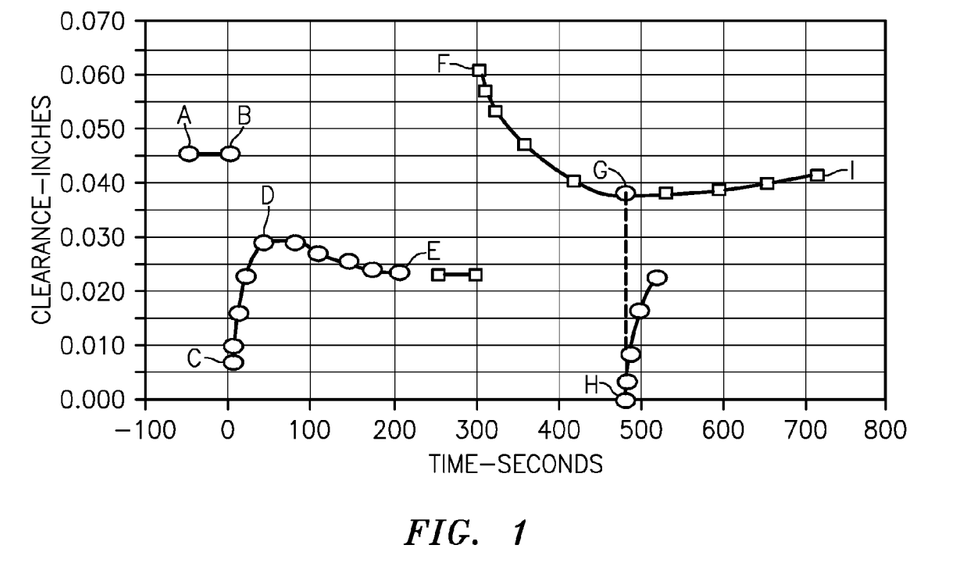
FIG. 1 is a graph depicting blade tip/shroud clearance as a function of time for a typical prior art engine compressor.

FIG. 1 is a diagrammatic graph of a compressor blade tip clearance versus response time typical of a prior art gas turbine engine. At position A, the engine is running at a steady-state idle condition (i.e., low rpm's, low core gas temperature). At position B, the engine is sharply accelerated (e.g., acceleration for takeoff). As a result of the acceleration, the blade tip clearance decreases dramatically, reaching a minimum clearance at position C. At this point, the change in clearance is almost entirely attributable to mechanical growth of the rotor assembly as a result of the centrifugal loading on the rotor assembly and the thermal growth of the blade.

The increase in core gas temperature that accompanies the acceleration next causes thermal radial growth of the casing surrounding the rotor assembly (from position C to position D). The decrease in clearance between positions D and E is attributable to the eventual thermal growth of the rotor disk. The greater mass of the rotor assembly, in particular the rotor disk, causes it to have a slower thermal response than that of the casing. The eventual stabilized clearance at position E is a function of the final temperatures of the disc, blades, casing, the centrifugal pull, and the coefficient of thermal expansion of each part of the rotor assembly and casing.

The significant increase in clearance between positions E and F is a result of a deceleration. The deceleration causes a decrease in the centrifugal loading on the rotor assembly and rapid cooling of the blades, which results in a decrease in the mechanical growth of the rotor assembly. Under normal conditions, the clearance will decrease in the manner suggested by the line extending between positions F and I. Here again, however, the clearance will depend on the thermal responses of the disc and the casing.

If, however, a sharp acceleration is performed between positions G and H, the clearance in a prior art compressor will decrease significantly. The decrease in clearance results from the combination of: 1) the almost immediate mechanical growth of the rotor assembly; 2) the already decreased casing inner radial dimension as a result of the casing's relatively immediate thermal response rate following the deceleration; and 3) the lack of decrease in rotor assembly dimensions attributable to the rotor's relatively slow thermal response. With respect to the latter two factors, the difference in thermal response between the casing and the rotor assembly creates a situation where the casing has already substantially returned to its pre-thermal growth dimension, but the rotor assembly has not yet returned to its pre-thermal growth dimension. The resultant rub-out of the seal is shown at position H. In prior art gas turbine engines, the clearance at position H is often chosen as the worst-case clearance and blade tip clearance is designed to accommodate the operating scenario present at position H. As a result, the blade tip/casing clearances are minimum at position H, but less than optimum under normal operating conditions (e.g., positions A-G).

Thus, what is needed is an improved apparatus and method for maintaining a desired compressor blade tip clearance throughout transient and steady-state operation of the gas turbine engine.

What is also needed is an improved apparatus and method for maintaining turbine clearance closure concurrently with the desired compressor blade tip clearance throughout transient and steady-state operation of the gas turbine engine.

SUMMARY OF THE DISCLOSURE

In accordance with one aspect of the present disclosure, a zero running clearance system for gas turbine engines broadly comprising at least one first rotor assembly of a gas turbine engine compressor rotatable around a rotational axis, each first rotor assembly having a plurality of blades with each blade having a tip; at least one first stator assembly of the gas turbine engine compressor disposed adjacent at least one first rotor assembly; at least one first shroud segment having blade seal surfaces disposed radially outside of at least one first rotor assembly; at least one second rotor assembly of a gas turbine engine turbine rotatable around the rotational axis, each second rotor assembly having a plurality of blades with each blade having a tip; at least one second stator assembly of the gas turbine engine turbine disposed adjacent at least one second rotor assembly; at least one second shroud segment having blade seal surfaces disposed radially outside of at least one second rotor assembly, wherein the blade tips and the blade seal surfaces have mating geometries and a clearance distance extending between the blade tips and the blade seal surfaces; an actuator selectively operable to move at least one first rotor assembly and said at least one second rotor assembly to alter the clearance distance; and means for controlling the actuator at a response rate sufficient to alter the clearance distance.

In accordance with another aspect of the present disclosure, a method for controlling blade tip clearance within a gas turbine engine broadly comprises providing a compressor having at least one first rotor assembly, each first rotor assembly having a plurality of blades with each blade having a blade tip, at least one first stator assembly disposed adjacent at least one first rotor assembly, and a shroud having at least one blade seal surfaces disposed radially outside of at least one first rotor assembly, wherein the blade tips in each of at least one first rotor assembly has a mating geometry with at least one of at least one blade seal surface, and a clearance distance extending between the blade tips and the blade seal surfaces; providing a turbine having at least one second rotor assembly, each second rotor assembly having a plurality of blades with each blade having a blade tip, at least one second stator assembly disposed adjacent at least one second rotor assembly, and the shroud having at least one blade seal surfaces disposed radially outside of at least one second rotor assembly, wherein the blade tips in each of at least one second rotor assembly has a mating geometry with at least one of at least one blade seal surface, and a clearance distance extending between the blade tips and the blade seal surfaces; providing an actuator selectively operable to move at least one rotor assembly relative to the shroud; providing an electronic engine controller having a control logic for operating said actuator; and moving at least one first rotor assemblies and at least one second rotor assembly relative to the shroud using the actuator at a response rate according to the control logic to alter the clearance distance.

These and other objects, features and advantages of the present disclosure will become apparent in light of the detailed description of the best mode embodiment thereof, as illustrated in the accompanying drawings.

DETAILED DESCRIPTION OF THE DISCLOSURE

Figure 2:
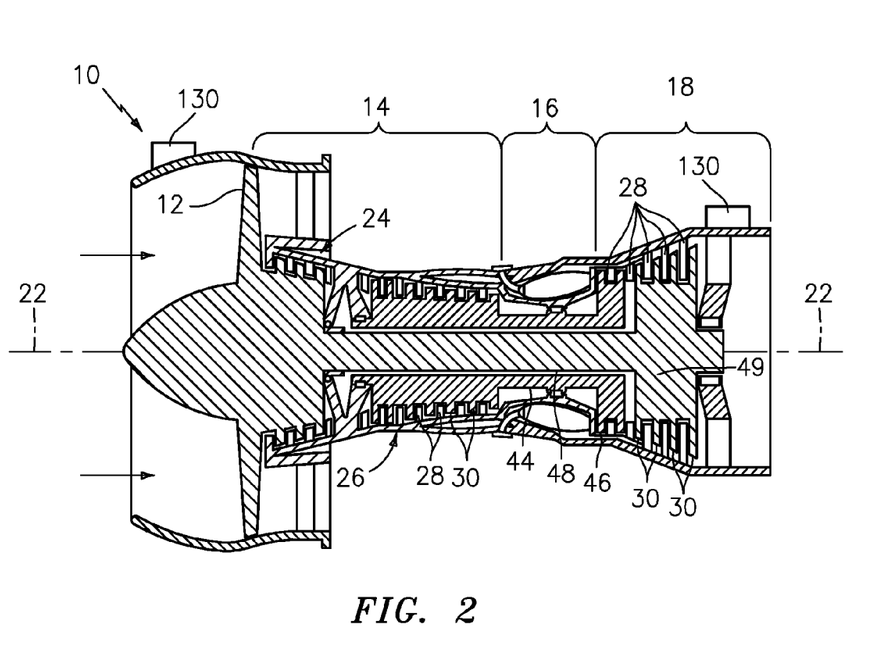
FIG. 2 is a diagrammatic sectional of a gas turbine engine.
Figure 3:
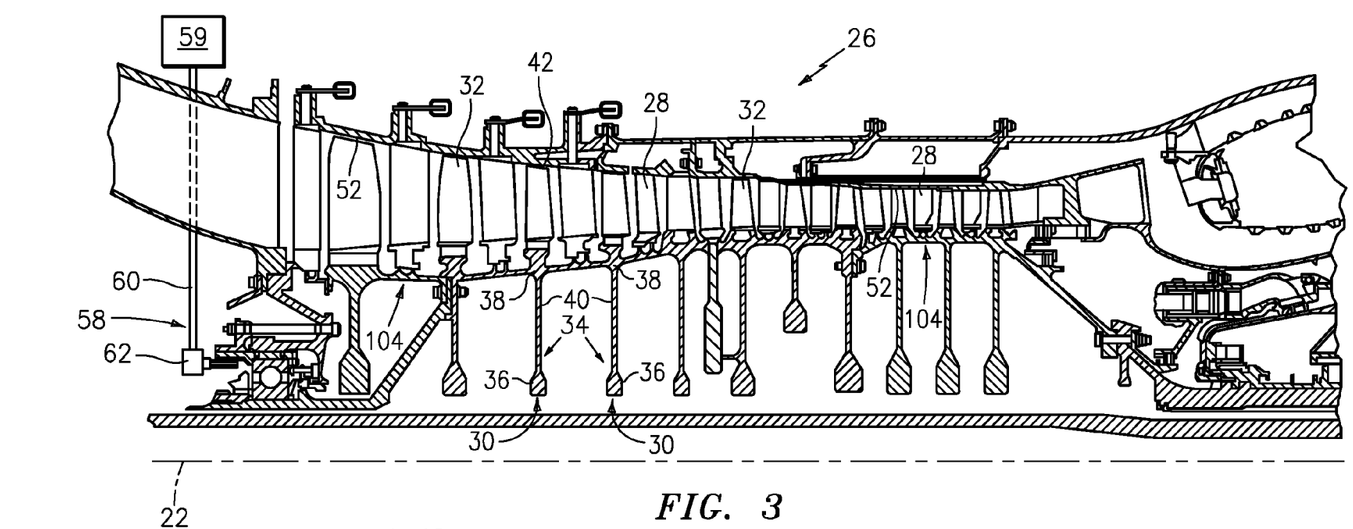
FIG. 3 is a diagrammatic view of a high-pressure compressor having a plurality of stages.

Referring to FIGS. 2 and 3, a gas turbine engine 10 is diagrammatically shown that includes a fan section 12, a compressor section 14, a combustor section 16, and a turbine section 18. The engine 10 has an axially extending centerline 22. Ambient air enters the engine 10 through the fan section 12. A fraction of that air subsequently travels through the compressor, combustor, and turbine sections 14, 16, 18 as core gas flow before exiting through a nozzle.

The compressor 14 may be a single unit or may be sectioned into a low-pressure compressor 24 and a high-pressure compressor 26. Both the low-pressure compressor 24 and the high-pressure compressor 26 (or the single compressor embodiment) include a plurality of stator assemblies 28 and rotor assemblies 30. The stator assemblies 28 include a plurality of segments, each having one or more stator vanes disposed between an inner platform and an outer platform. The segments of each stator assembly 28 collectively form an annular structure that is disposed adjacent a rotor assembly 30.

Each rotor assembly 30 includes a plurality of blades 32 and a disk 34 rotatable around the axially extending centerline 22 of the engine 10. The disk 34 includes a hub 36, a rim 38, and a web 40 extending there between. The blades 32 are attached to and extend radially out from the rim 38. Each blade 32 includes a tip 42 that is disposed at a tip angle relative to the axial centerline 22 that is greater than zero (i.e., the blade tip angle is not parallel with the axial centerline 22). The blade tip angle for each blade 32 in a particular rotor assembly 30 is the same for each blade 32 within that rotor assembly 30. Different rotor assemblies 30 may, however, have different blade tip angles. The rotor assemblies 30 within the low-pressure compressor 24 are mechanically attached to one another and therefore rotate together. The rotor assemblies 30 within the high-pressure compressor 26 are mechanically attached to one another and therefore rotate together.

A shaft connects the compressor 14 to the turbine 18. In those embodiments that include a low-pressure compressor 24 and a high-pressure compressor 26, the high-pressure compressor 26 is connected by a first shaft 44 ("HP shaft") to a high-pressure turbine section 46 and the low-pressure compressor 24 is connected by a second shaft 48 ("LP shaft") to a low-pressure turbine section 49.

Figure 4:
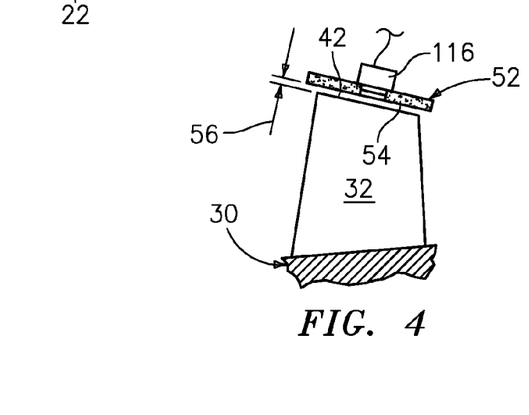
FIG. 4 is a diagrammatic view of a blade tip and a shroud sealing surface.

Referring to FIGS. 3 and 4, a circumferentially extending shroud 52 is disposed radially outside of each rotor assembly. Each shroud 52 may consist of a single segment or of multiple segments. The shroud 52 includes a blade seal surface 54 that is radially aligned with the blade tips 42 of the rotor assembly 30. The blade seal surface 54 is disposed at substantially the same angle as the blade tip angle of the rotor assembly 30; i.e., both the blade tip angle and the shroud blade seal surface angle are substantially equal and both are at an angle relative to the axial centerline 22 that is greater than zero. The configuration of the rotor blade tips 42 disposed radially inside of the shroud blade seal surfaces 54, both of which are at an angle relative to the axial centerline 22 that is greater than zero, may be referred to as mating conical geometries. The distance 56 extending between the blade tips 42 and the blade seal surface 54 is referred to as the clearance distance 56 between the rotor assembly 30 and the shroud 52.

The rotor assemblies 30 of the compressor 14 are attached to an actuator assembly 58 that is selectively operable to move one or both of the shroud 52 segments and rotor assemblies 30 relative to the other of the shroud 52 segments and rotor assemblies 30. The relative movement of the one or both of the shroud 52 segments and rotor assemblies 30 relative to the other of the shroud 52 segments and rotor assemblies 30 alters the clearance distance 56 between the blade tips 42 and the blade seal surface 54 for each stage of the compressor 14, or the portion 24, 26 of the compressor 14 in which the rotor assemblies 30 are located.

Figure 6:
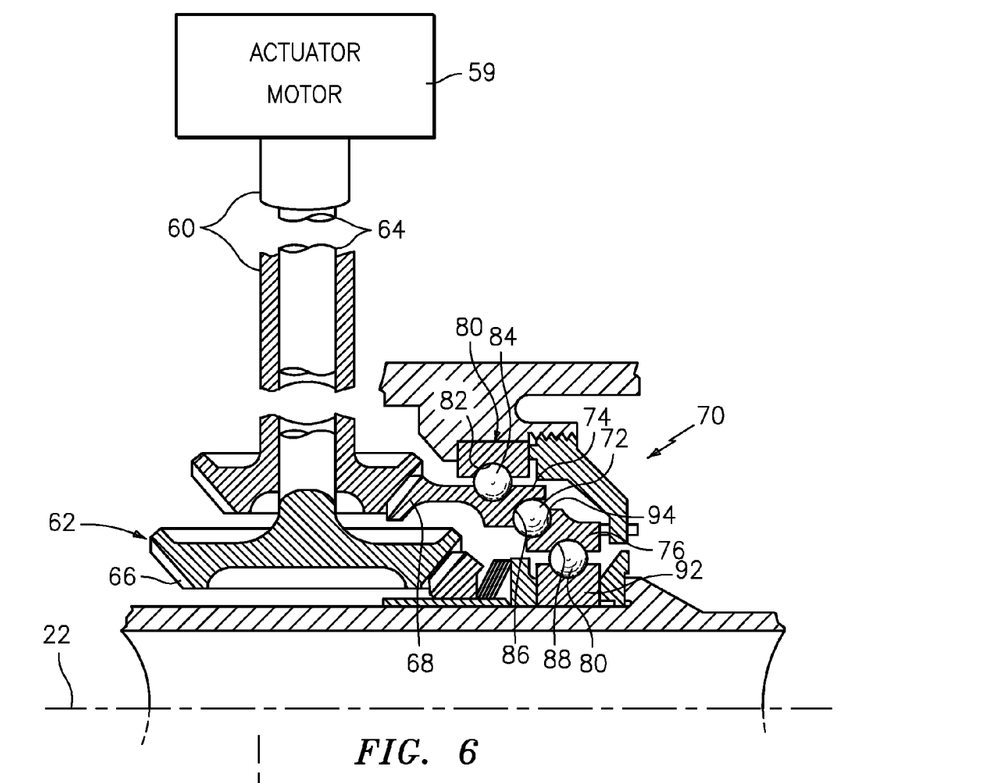
FIG. 6 is a diagrammatic view of a motor, tower shaft, gear arrangement and actuator embodiment.

In the embodiment shown in FIGS. 3 and 6, the actuator 58 includes a motor 59 (e.g., a hydraulic motor shown diagrammatically) connected to a tower shaft 60 (hereinafter referred to as the "clearance drive" tower shaft 60) disposed approximately perpendicular to the axial centerline 22 of the engine 10. The clearance drive tower shaft 60 enables movement of one of the low-pressure compressor 24 or the high-pressure compressor 26 relative to the shroud 52. For illustration purposes, FIG. 3 shows the actuator 58 operably connected to the high-pressure compressor 26. In alternative embodiments, the actuator 58 could be connected to the low-pressure compressor 24, or the high-pressure and low-pressure compressors 24, 26 could each be connected to independent actuators 58. One end of the clearance drive tower shaft 60 is operably connected to the motor 59. The other end of the clearance drive tower shaft 60 is connected to a gear arrangement 62. FIG. 6 shows the HPC clearance drive tower shaft 60 concentrically arranged with an accessory drive shaft 64. Other tower shaft arrangements may be used alternatively. The gear arrangement 62 is connected to the rotor assembly(ies) 30 by a mechanism that converts rotational movement to linear movement. Screw thread devices, for example, can be used to create the desired linear movement. Examples of screw thread devices are provided below. The present disclosure is not, however, limited to devices that use rotational and linear movement. Linear actuators can be used in some applications.

Figure 7:
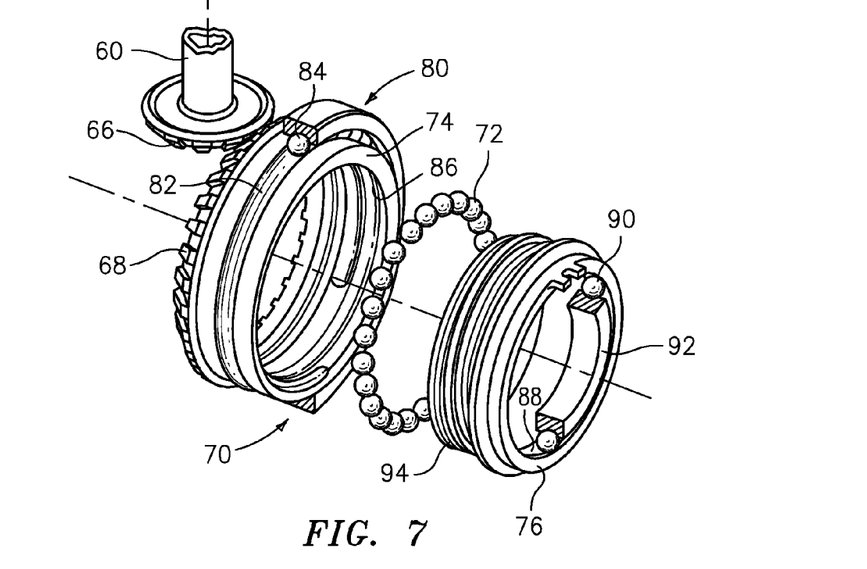
FIG. 7 is an exploded view of a ball screw actuator similar to the one depicted in FIG. 6.
Figure 8:
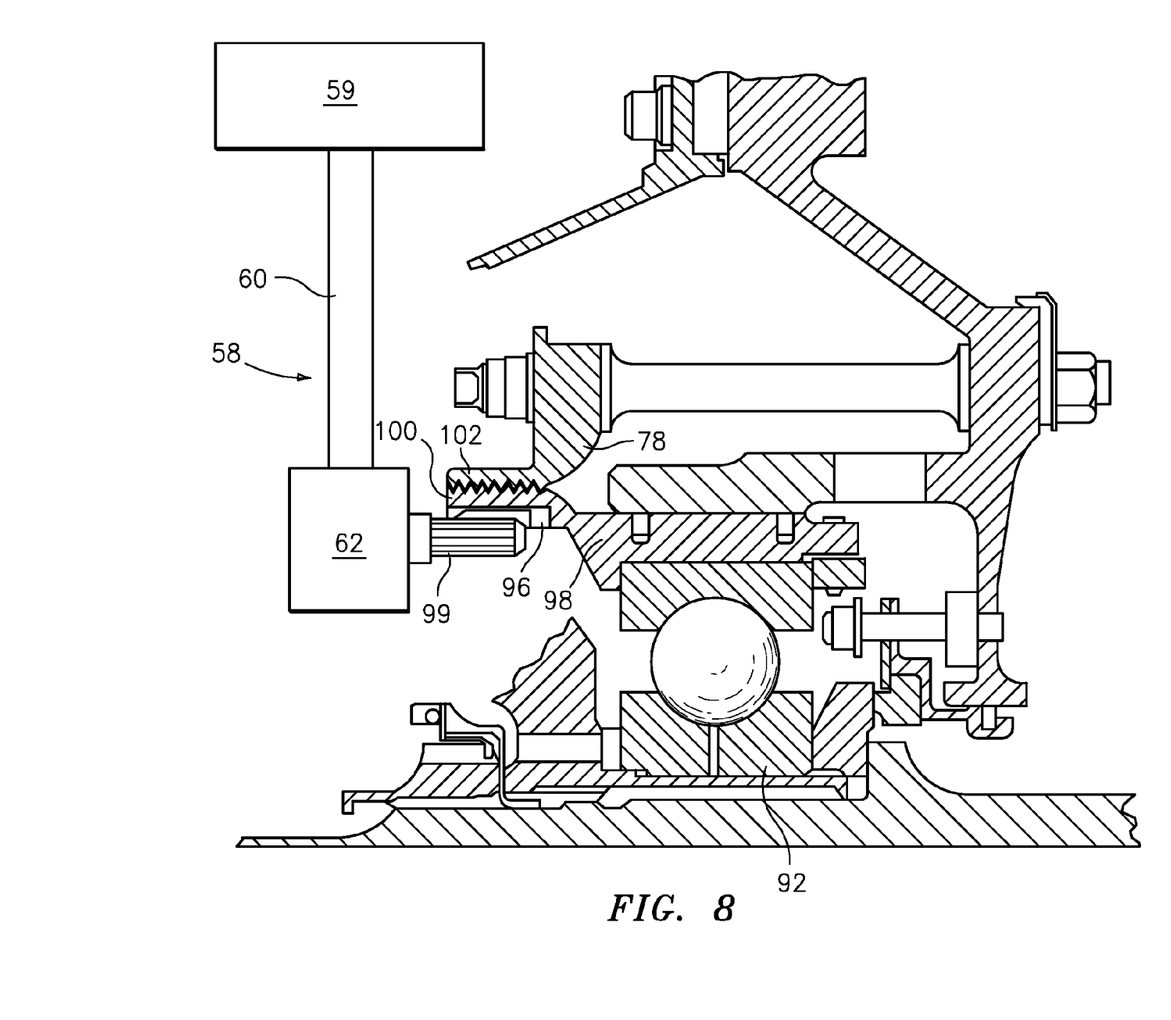
FIG. 8 is a diagrammatic view of a motor, tower shaft, gear arrangement and actuator embodiment.

In the embodiment shown in FIGS. 6-8, the gear arrangement 62 includes a first bevel gear 66 attached to the clearance drive tower shaft 60, and a second bevel gear 68 attached to a ball screw type actuator 70, which is a type of screw thread device. The ball screw actuator 70 is connected to the rotor assemblies 30 of the high-pressure compressor 26. Specifically, the ball screw actuator 70 includes a plurality of ball bearings 72 disposed between a first member 74 and a second member 76. The first member 74 is attached to the second bevel gear 68 and is mounted relative to the casing 78, including the shrouds 52, via a casing bearing 80. The first member 74 includes an outer diameter circumferential groove 82 for receiving the ball bearings 84 of the casing bearing 80, and an inner diameter helical groove 86 for receiving the ball bearings 72 of the ball screw actuator 70. In a similar manner, the second member 76 of the ball screw actuator 70 includes an inner diameter circumferential groove 88 for receiving the ball bearings 90 of a shaft bearing 92, and an outer diameter helical groove 94 for receiving the ball bearings 72 of the ball screw actuator 70. When the ball screw actuator 70 is assembled, the helical grooves 86, 94 of the first member 74 and second member 76 face one another and collectively provide the helical pathway for the ball screw actuator ball bearings 72. Rotation of the first member 74 of the ball screw actuator 70 causes the second member 76 of the ball screw actuator 70 (non-rotationally attached to the rotor assembly (ies) 30) to travel relative to the first member 74. As a result, the rotor assemblies 30 of the high-pressure compressor 26 attached to the second member 76 travel relative to the first member 74 as well.

In alternative embodiments, the actuator 58 includes the motor 59 (e.g., a hydraulic motor) and a tower shaft 62 arrangement similar to that described above. In the alternative embodiments, however, the gear arrangement 62 engaged with the tower shaft 62 can include a variety of different gear combinations and/or types of gears; e.g., combinations of bevel gears and spur gears, shafts, etc. The embodiment shown in FIGS. 3 and 8, for example, includes a spur gear 96 attached to a bearing mount 98. The gear arrangement 62 includes a gear 99 for engaging the spur gear 96 attached to the bearing mount 98. The bearing mount 98 also has a screw thread portion 100 that mates with a screw thread portion 102 of the casing 78. Rotation of the tower shaft 62 via the motor 59, causes the bearing mount 98 to rotate relative to the casing 78. The screw thread engagement between the casing 78 and the bearing mount 98 causes the rotating bearing mount 98 to travel in the same direction. As a result, the shaft bearing 92 and attached rotor assemblies 30 of the high-pressure compressor 26 travel in the same direction as well.

The above-described actuator 58, gear arrangement 62, and motor combinations are examples of how the movement of one or more rotor assemblies 30 can be accomplished. The present disclosure is not limited to these examples.

Figure 5:
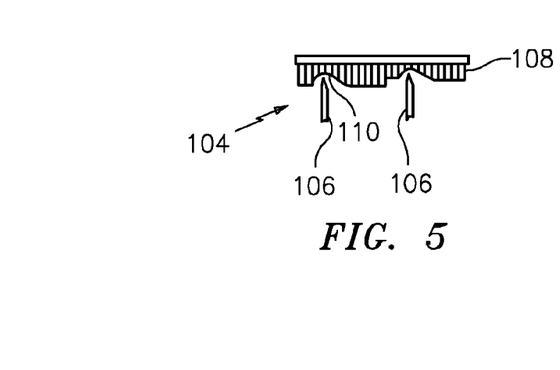
FIG. 5 is a diagrammatic view of a knife-edge seal having a knife-edge portion and an abradable pad.

Referring to FIGS. 3 and 5, many gas turbine engines 10 utilize knife-edge seal arrangements 104 to seal between rotor assemblies 30 and stator assemblies 28 of the compressor outside of the core gas path, and similar knife-edge seals are utilized in the turbine section. The knife-edge seal arrangements 104 typically comprise a knife-edge portion 106 attached to a flange extending out from the web 40 or rim 38 of a rotor assembly disc 34. An abradable pad 108 is disposed opposite the knife-edge portion(s) 106, attached to the stator assembly 28. In prior art applications, the knife-edge portion 106 is permitted to abrade a channel within the abradable pad 108 during operation of the engine 10. The channel is radially aligned with the knife-edge portion 106. The depth of the channel is dictated by the largest radial incursion of the knife-edge 106 into the abradable pad 108. Once the maximum depth of the channel is established, any radial position less than the aforesaid largest incursion, such as would be the case for partial power operation, will permit leakage of air between the knife-edge portion 106 and the abradable pad 108.

The present disclosure permits the use of knife-edge seal arrangements 104 to seal between rotor assemblies 30 and stator assemblies 28, outside of the core gas path. Under the present disclosure, however, the clearance between the knife-edge portion 106 and the abradable pad 108 is not dictated by the largest radial incursion of the knife-edge portion 106 into the abradable pad 108. Instead, the present disclosure utilizes an abradable pad 108 having a preformed channel 110 or channel formed by engine operation that is contoured to accommodate the position of the knife-edge portion 106. FIG. 5 shows an abradable pad 108 with a channel 110 having a predetermined shape. The channel 110 shape causes the radial gap between the knife-edge portion 106 and the abradable pad 108 to change based on the relative positions of the knife-edge portion 106 and the abradable pad 108. Optimum channel 110 geometry can be determined by analysis for a given application. For example, a first radial gap can be provided adjacent one side of the channel 110 and a second radial gap at the opposite side of the channel 110 to accommodate different operating conditions. A variety of channel 110 geometries are possible to accommodate various operating conditions, and the present disclosure seal arrangement is not limited to any particular channel 110 geometry.

In the operation of the present disclosure, the rotor assemblies 30 of the high-pressure compressor 26 are positioned at an initial position that provides a desired blade tip 42/shroud 52 clearance. Almost immediately after the operating condition of the gas turbine engine 10 changes from the first operating condition (e.g., steady-state idle) to a second operating condition (e.g., takeoff acceleration, any intermediate power level or full power) the clearances between the rotor blade tips 42 and the shroud 52 will begin to change. The change will continue until the engine 10 reaches steady state at the new operating condition. The amount of time required for the complete clearance change to occur will depend upon the specifics of the gas turbine engine 10 at hand, and the magnitude of the change between the first and second operating conditions.

An advantage of the present disclosure blade tip clearance apparatus is the speed at which the blade tip clearance distance 56 can be changed. The present disclosure apparatus does not utilize cooling air to thermally expand (or contract) elements to create a desired clearance condition. Thermal expansion/contraction is a relatively slow process.

The presently disclosed apparatus, in contrast, utilizes a mechanical actuator 58 to move one of the shroud 52 or the rotor assembly 30 relative to the other. In the example provided above, the rotor assemblies 30 of the high-pressure compressor 26 are moved relative to the blade seal surfaces 54 of the shroud 52 to either increase or decrease the clearance distance 56. Hence, the speed at which blade tip clearance change can be accomplished is limited by the operating speed of the actuator 58, the reaction time of the aircraft's operator and/or the programmed response by the electronic engine controller 130 with respect to changes in engine operating parameters. To overcome these operating limitations, a control logic algorithm stored in the electronic engine controller 130 may be utilized to operate the mechanics involved at a response rate sufficient to alter the clearance distance.

The control logic algorithm is designed to operate the actuator 58 in a manner more closely resembling the response rate of a commanded throttle change by the aircraft operator, rather than the rate of the resulting engine parameter change such as rotor speed or engine pressure(s). Since such parameter changes cause rotor expansion and blade deflections, both expansion and deflection will occur to a certain degree if the electronic engine controller 130 does not respond in advance of the changes to prevent rotor-to-outer air seal interference. The control logic algorithm permits opening the clearance between a rotor and an outer air seal at a response rate that is faster than the gas turbine engine can accelerate from idle to full power (or from/to any intermediate power). In turn, the rotor-to-outer air seal clearance can be held to be essentially zero while the gas turbine engine is in a quasi-steady state condition. The electronic engine controller 130 is programmed via the control logic algorithm to open clearances very rapidly as the aircraft operator commands an acceleration without concern that the seal will rub out due to the rapid expansion of the rotor which may take place as the rotor speed increases.

The control logic algorithm may take into account factors such as the turbulence-induced deflections possible as a function of altitude, the maneuvering commanded of the aircraft, such as a high-g turn, and also the recent power settings of the engine if the length of the steady-state period has been brief and thus might have an impact on clearances as the rotor and casing cools or heats further.

Figure 9:
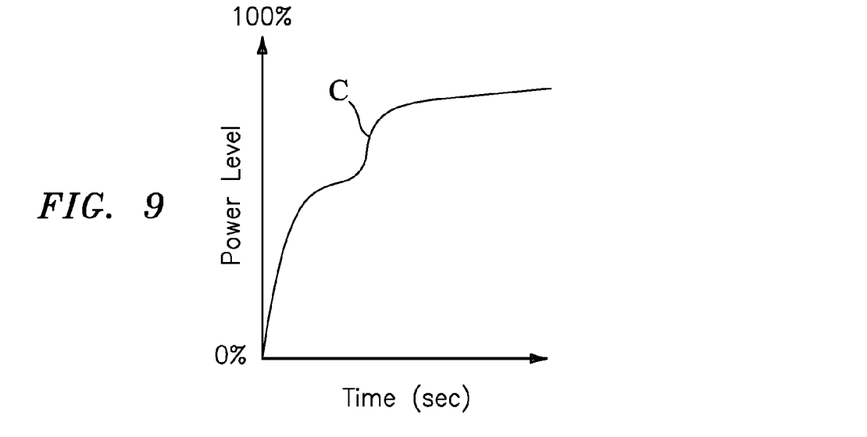
FIG. 9 is a graph representing a response rate based upon the input, or power level, to the electronic engine controller over a period of time by the aircraft operator's power lever or aircraft's auto throttle system (C)
Figure 10:
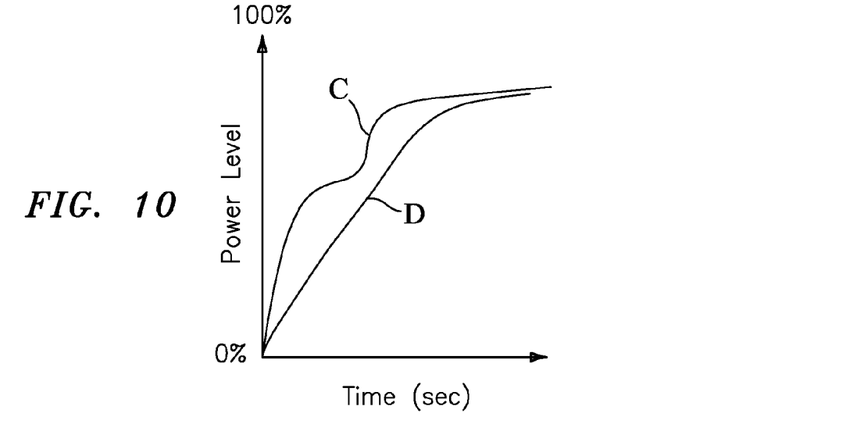
FIG. 10 is a graph representing a comparison of a response rate of the exemplary control logic algorithm (D) as a measure of the input, or power level, to the electronic engine controller over a period of time in relation to response rate (C)
Figure 11:
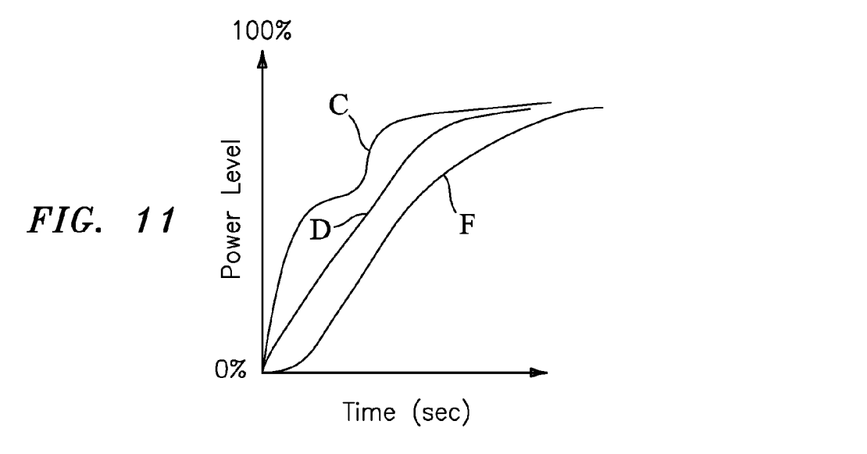
FIG. 11 is a graph representing a comparison of the response rate (D) with respect to the response rate (C) and a response rate of the electronic engine controller without the use of the exemplary algorithm (F)

Referring now to FIGS. 9-11, Curve C is either (a) the input commanded to the aircraft operator's power level or (b) the input to the electronic engine controller 130 commanded by the aircraft's auto-throttle computer. The y-axis represents this input as a change from 0% to 100%, where 0% is the current power setting and 100% is the new power setting. No matter how fast the input change in C is, the electronic engine controller 130 will only allow the gas turbine engine to accelerate at a slower rate designated as F in FIGS. 9-11. The underlying reason for this slower rate F is the gas turbine engine must operate in a stable manner and certain devices such as variable vanes and engine bleeds on the compressor and the fuel flow change rate must be properly coordinated to the engine airflow to achieve engine acceleration without causing an engine surge. A response rate of the rotor clearance system, designated as D in FIGS. 9-11, is controlled by the control logic algorithm described herein such that the response rate of D falls between C and F. The response rate D achieved by the control logic algorithm is slower than either (a) the input commanded by the aircraft operator power lever or (b) the aircraft's auto-throttle computer, and yet faster than the maximum engine rate F as typically programmed in the electronic engine controller 130.

The response rate D of the control logic algorithm can be influenced by several factors. First, the response rate D may be a function of an altitude of the aircraft relative to the clearance distance to prevent local rubbing caused by g-loads when the gas turbine engine experiences turbulent airflow during altitude variations. Generally, an average clearance distance may be maintained at an average altitude as recognized and understood by one of ordinary skill in the art. When data collected by the electronic engine controller 130 indicates a change in altitude, the clearance distance may be increased and become greater than the average clearance distance at altitudes less than the average altitude, or may be decreased and become less than the average clearance distance at altitudes greater than the average altitude.

Secondly, the response rate D may be a function of a g-load imparted by an aircraft maneuver. During such maneuvers, the g-loads imparted upon the gas turbine engine may cause the rotors to rub locally against the seals. When data collected by the electronic engine controller 130 indicates the aircraft is commanded into a maneuver that would cause a g-load, the clearance distance may be increased or decreased depending upon the g-load anticipated to prevent rotor-to-outer air seal interference.

Thirdly, the response rate D may be a function of the temperature of at least any one of the following gas turbine engine components: first rotor assembly, second rotor assembly, first shroud segment and second shroud segment. As understood by one of ordinary skill in the art, gas turbine engines, and their components, maintain a steady-state temperature during operation. In response to an increase or decrease in temperature compared to the steady state temperature, the clearance distance may be increased or decreased to prevent rotor-to-outer air seal interference. If the temperature of the aforementioned components rises, the components will expand and rotor-to-outer air seal interference may occur. Data collected by the electronic engine controller 130 can monitor the temperature of the gas turbine engine, and its components, and compare the operating temperature to the steady state temperature.

Active clearance control systems of any type, such as mechanical-mechanism, hydraulic actuating systems, electric actuating systems, pneumatic actuating systems, may employ the control logic algorithm described herein. All such active clearance control systems can be operated so that rotor-to-outer air seal clearance may be held to essentially zero while the gas turbine engine operates in a quasi-steady state condition. The control logic algorithm described herein can open clearances very rapidly as the aircraft operator commands an acceleration without concern that rotor-to-outer air seal interference may occur due to rapid expansion of the rotor immediately upon acceleration.

Referring now to FIG. 4, in some embodiments of the present disclosure, a sensor arrangement 116 can be used to actively control blade tip clearance in conjunction with the aforementioned control logic algorithm. For example, it is known to use microwave sensors to determine the clearance gap between rotor blade tips 42 and a shroud 52. Under the present disclosure, as will be described below, the clearance gap between the blade tips 42 of a rotor assembly 30 and the blade seal surface 54 of the shroud 52 can be modified based on the information determined using the sensors.

In those embodiments where sensors 116 are used to sense blade tip to shroud 52 clearance, the sensor signals can be used as input data to control the actuator 58 of the present disclosure apparatus. The rate at which sensor data is acquired can be varied to suit the application at hand. For example, sensor data can be acquired at set intervals and that data can then be used to adjust the clearance as necessary. Alternatively, the sensors 116 can be activated upon the occurrence of certain events, or some combination of an event trigger and periodic acquisition. In all cases, once the sensor data is collected it can be used as an input for the purpose of adjusting the blade tip/shroud clearance 56 as necessary.

For example, a desired blade tip/shroud clearance distance 56 with respect to a given set of operating conditions can be compared against a sensed actual clearance value to determine the difference there between. If the difference is outside of a predetermined acceptable range, then the actuator 58 can be selectively operated to move one of the shrouds 52 or rotor assembly(ies) 30 relative to the other to decrease the blade tip clearance distance 56 to within the acceptable range. Or, a series of engine tests could be run with instrumentation to determine the axial and radial clearance characteristics of the engine. The data collected would provide the basis for a control algorithm for the actuator.

Figure 12:
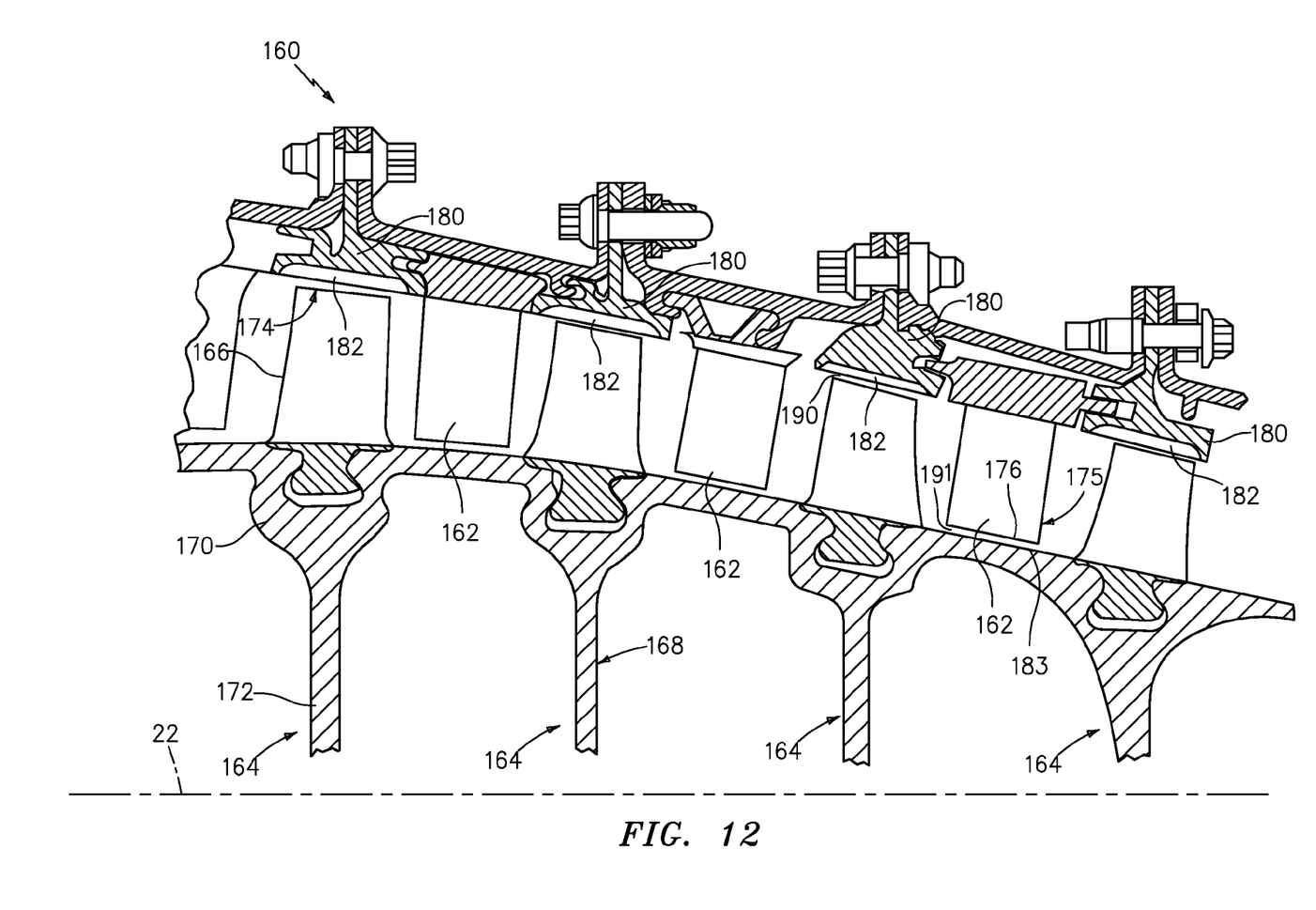
FIG. 12 is a diagrammatic view of a high-pressure compressor having a plurality of cantilevered stators and utilizing the zero running clearance system of the present disclosure.

Referring to FIG. 12, an alternative embodiment of compressor section 160 of gas turbine engine 10 is shown. Compressor 160 may be a single unit or may be sectioned into a low-pressure compressor and a high-pressure compressor (or the single compressor embodiment) and includes a plurality of cantilevered stator assemblies 162 and rotor assemblies 64. The cantilevered stator assemblies 162 may include a plurality of segments, each having one or more stator vanes mounted to an outer platform, and disposed adjacent rotor assembly 64. Each stator vane 175 may include a tip 176 that is disposed at a tip angle relative to the axial centerline 22 that is greater than zero, i.e., the cantilevered stator tip is not parallel with the centerline axis 22. The vane tip angle for each stator vane 175 in a particular cantilevered stator vane assembly 162 is the same for each stator vane 175 within that cantilevered stator vane assembly 162. Different cantilevered stator vane assemblies 162 may, however, have different vane tip angles.

Each rotor assembly 164 may include a plurality of blades 166 and a disk 168 rotatable around the axially extending centerline 22 of the engine 10. The disk 168 includes a hub (not shown), a rim 170, and a web 172 extending therebetween. The blades 166 are attached to and extend radially out from the rim 170. Each blade 166 includes a tip 174 that is disposed at a tip angle relative to the axial centerline 22 that is greater than zero (i.e., the blade tip angle is not parallel with the axial centerline 22). The blade tip angle for each blade 174 in a particular rotor assembly 164 is the same for each blade 166 within that rotor assembly 164. Different rotor assemblies 164 may, however, have different blade tip angles. The rotor assemblies within the compressor are mechanically attached to one another and therefore rotate together.

A circumferentially extending shroud 180 is disposed radially outside each rotor assembly 164. Each shroud 180 may consist of a single segment or multiple segments. The shroud 180 includes a blade seal surface 182 that is radially aligned with the blade tips 174 of the rotor assemblies 164 that, in turn, include a vane seal surface 183 that is radially aligned with the vane tips 176 of the cantilevered stator vane assemblies 162. The blade seal surface 182 and vane seal surface 183 are disposed at substantially the same angle as the blade tip angle of the rotor assemblies 164 and the vane tip angle of the cantilevered stator assemblies 162 respectively, i.e., both the blade tip angle, vane tip angle and the shroud blade and vane seal surface angles are substantially equal and all are at an angle relative to the axial centerline 22 that is greater than zero. The configuration of the rotor blade tips 174 and the stator vane tips 176 disposed radially inside and outside of the blade and vane seal surfaces 182, 183, respectively, all of which are at an angle relative to the axial centerline 22 that is greater than zero, may be referred to as mating conical geometries. The distance 190 extending between the blade tips 174 and the blade seal surface 182 and the distance 191 between the vane tips 176 and the vane seal surface 183 is referred to as blade tip clearance and vane tip clearance, respectively.

As described with respect to the rotor assemblies 30 of compressor 14, turbine rotor assemblies 104 are also attached to the actuator 58. The actuator 58 is selectively operable to move both the rotor assemblies 30 of the compressor 14 and the rotor assembly 104 of the turbine 18. The relative movement of the rotor assemblies 104 and the sealing surfaces 120 alters the clearance distance 101 in the turbine. Simultaneously, the relative movement of the compressor rotor assemblies 30 alters the clearance distance 90 between the blade tips 74 and the blade seal surfaces 82 for each stage of the compressor 14. It is contemplated that the rotor assemblies 30 or 64 of compressor 14 or 60 and rotor assemblies 104 of turbine 18 are actuated in the same manner as described above in all of the embodiments contemplated herein and illustrated in FIGS. 3-9. The above-described actuator 58, gear arrangement 62, and motor combinations are examples of how the movement of the rotor assemblies 30, 64 and 104 can be accomplished. The present disclosure is not limited to these examples.

Figure 13:
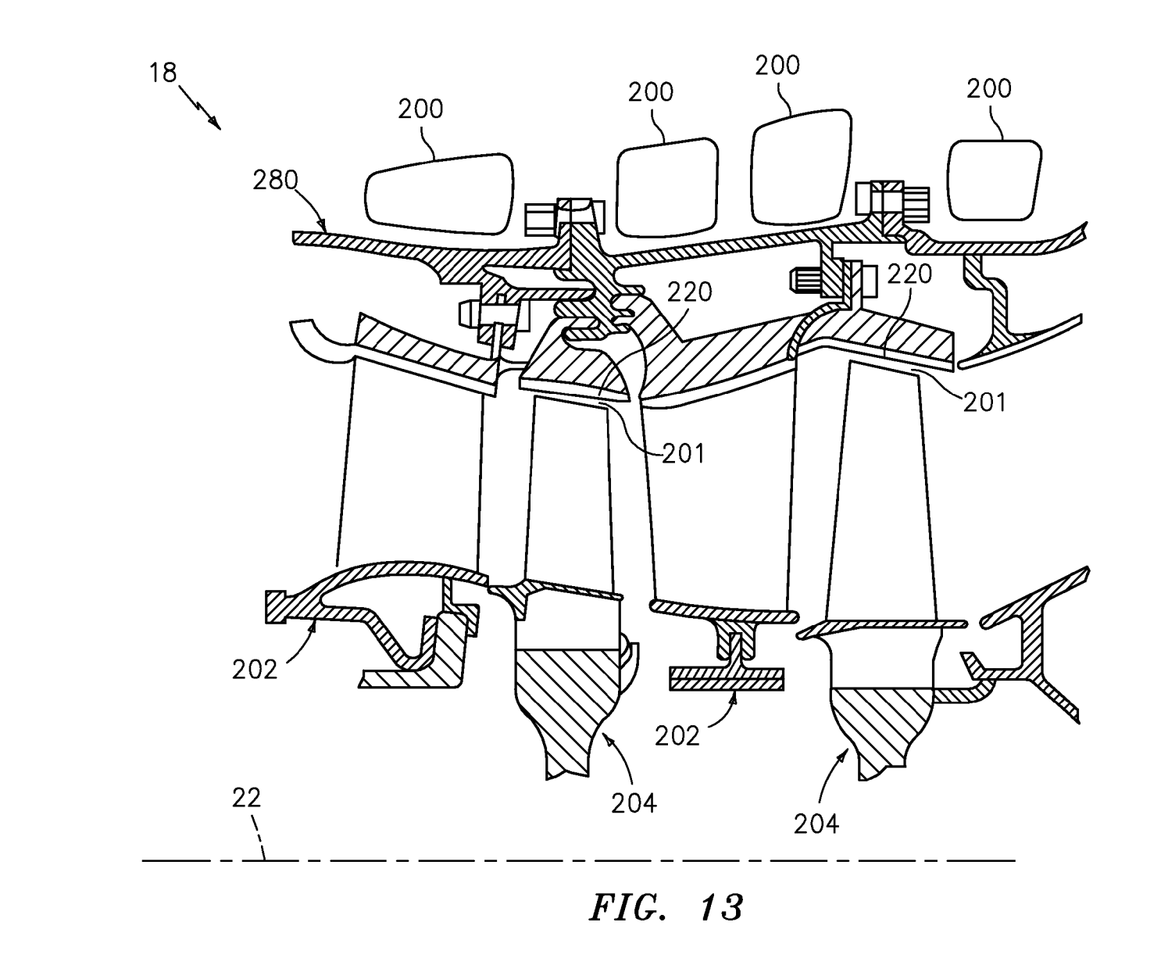
FIG. 13 is a diagrammatic view of a high-pressure turbine utilizing the zero running clearance system of the present invention in conjunction with a thermal active clearance control system.

Referring now to FIG. 13, FIG. 13 illustrates the use of the zero running clearance system to control blade tip clearances within the turbine sections of a gas turbine engine based upon axial rotor position. This embodiment may be combined with the compressor embodiment depicted in FIG. 3 or with the alternative compressor embodiment depicted in FIG. 12, or the turbine blade clearance control embodiment depicted in FIG. 13 may be implemented without use of compressor clearance control. Referring to FIG. 13, one or more second stator vane assemblies 202 and one or more second rotor assemblies 204 may be found within the turbine 18 of the gas turbine engine 10. Both assemblies 202, 204 are mounted and configured in the same manner as described above for the compressor 14.

As illustrated in FIG. 13, the zero running clearance system utilizes a flow path shaped to allow blade tips and mating seal surfaces to form matching conical surfaces as described for the compressor 26, with said conical surface at an angle greater than zero with the centerline 22 of the engine 10. This angle results in closure of the turbine tip clearance 201 when the zero running clearance actuator assembly displaces the rotor assembly aft. Alternatively, a flow path may be chosen that provides turbine tip clearance closure when the actuator assembly displaces the rotor assembly forward.

As described with respect to the rotor assemblies 30 of compressor 14, turbine rotor assemblies 104 are also attached to the actuator 58. The actuator 58 is selectively operable to axially move both the rotor assemblies 30 of the compressor 14 and the rotor assembly 204 of the turbine 18. The relative movement of the rotor assemblies 204 and the sealing surfaces 220 alters the clearance distance 101 in the turbine. Simultaneously, the relative movement of the compressor rotor assemblies 30 alters the clearance distance 190 between the blade tips 174 and the blade seal surfaces 182 for each stage of the compressor 14. It is contemplated that the rotor assemblies 30 or 164 of compressor 14 or 160 and rotor assemblies 204 of turbine 18 are actuated in an axial direction in the same manner as described above in all of the embodiments contemplated herein and illustrated in FIGS. 3-8, 12 and 13. The above-described actuator 58, gear arrangement 62, and motor combinations are examples of how the axial movement of one or more rotor assemblies 30, 164 and 204 can be accomplished. However, the present disclosure is not limited to these examples.

It is also contemplated that the sensor arrangement 116 illustrated in FIG. 4 and described above for active control of compressor blade tip clearance can also be used to actively control the blade tip clearance in the compressor 14 (or alternative embodiment 160) and turbine 18 simultaneously. Simultaneous control of both compressor and turbine blade tip clearances would utilize sensed tip clearances from both the compressor 14 and turbine 18 along with control algorithms to select the rotor position providing the optimum overall engine operation considering both compressor and turbine performance.

In those embodiments where sensors 116 are used to sense blade tip to shroud clearance, the sensor signals can be used as input data to control the actuator 58. The rate at which sensor data is acquired can be varied to suit the application at hand. For example, sensor data can be acquired at set intervals and that data can then be used to adjust the clearance as necessary. Alternatively, the sensors 116 can be activated upon the occurrence of certain events, or some combination of an event trigger and periodic acquisitions. In all cases, once the sensor data is collected it can be used as input for the purpose of adjusting the blade tip/shroud clearance as necessary.

For example, a desired blade tip/shroud clearance distance 52, 190 or 201 with respect to a given set of operating conditions can be compared against a sensed actual clearance value to determine the difference therebetween. If the difference is outside of a predetermined acceptable range, then the actuator 58 can be selectively operated to move the rotor assemblies 30, 164 or 204 to decrease the blade tip clearance distance 52, 190 or 201 to within the acceptable range.

Alternatively, a series of engine tests could be run with instrumentation to determine the axial and radial clearance characteristics of the engine. The data collected would provide the basis for a control algorithm for the actuator.

In another alternative, a gas turbine engine equipped with the zero running clearance system described herein may also use cooling air as contemplated in FIG. 13. Cooling air may be delivered to the turbine 18 using the thermal active clearance control system described in U.S. Pat. No. 5,005,352 to Schwarz et al. and U.S. Pat. No. 4,279,123 to Griffin et al., which are both incorporated by reference herein in their entirety and assigned to the assignee of the present application, United Technologies Corporation. Thermal active clearance control system employs spray tubes 200 positioned above shroud 180 as illustrated in FIG. 13.

The advantage(s) associated with the zero running clearance system described herein is the speed with which the system reacts to and adjusts the clearance distance. The zero running clearance system reacts as fast as or faster than a gas turbine engine can accelerate. When power is increased, for example, the electronic engine controller 130 must move the compressor variable stators, close engine bleeds and command higher fuel flow in a precise manner to prevent operational instability. With the addition of a zero running clearance system, the gas turbine engines will be able to operate with less reserve stability margin which will translate into a lighter weight engine with fewer compressor stages. The resultant gas turbine engine will also become lighter because cases will not have to be constructed as heavy to reduce the thermal response mismatch between the high-pressure compressor casing and disks and the high-pressure turbine casing and disks. The zero running clearance system will be able to correct the mismatch of all of the engine seals as long as they are uniformly mismatched. The resultant gas turbine engines will also become lighter because the transition duct from the low pressure compressor to the high pressure compressor will be significantly less when the compressor has a constant inner diameter wall because this maximizes the cone angle of the outer diameter wall, which aligns more closely to the low pressure compressor thus requiring less transition duct length. Lastly, the resultant engines when utilizing cantilevered stators which do not produce the rim cavity heat of honeycomb/knife edge seals allows the overall pressure ratio and the compressor exit temperature to be higher. This feature is advantageous when employing the zero running clearance system in military and commercial compressors due to the metallurgical limitations of the compressor and turbine disk materials.

With respect to the combination of the zero running clearance and thermal active clearance control systems, the thermal active clearance control system may be slow; however, the thermal active clearance control system is quite effective in making large changes in radial clearance that may be beyond the reasonable limits of the axially shifting rotor assembly scheme described herein. When used in conjunction with the zero running clearance system described herein, the thermal active clearance control system may be purposely scheduled to run with partially open clearance at cruise to accommodate an acceleration to climb power. The 'open clearance schedule' provides larger and larger clearance as cruise power is reduced, that is, as the aircraft burns off fuel, and is therefore known as the "cruise ramp" schedule. This open schedule is necessary because the rapid rotor growths due to power changes to achieve climb power are larger as cruise power settings are reduced. The zero running clearance system described herein allows this residual clearance needed by the thermal active clearance control system to be closed because the zero running clearance system is as fast as or faster than the rotor's transient expansion. Eliminating the open clearances with the zero running clearance system presents an opportunity for an important improvement in turbine efficiency, particularly for a single stage high pressure turbine where blade and seal leakage can be high and particularly costly to fuel consumption performance.

It is to be understood that the disclosure is not limited to the illustrations described and shown herein, which are deemed to be merely illustrative of the best modes of carrying out the disclosure, and which are susceptible to modification of form, size, arrangement of parts, and details of operation. The disclosure rather is intended to encompass all such modifications which are within its spirit and scope as defined by the claims.

What is claimed is:

1. A zero running clearance system for gas turbine engines, comprising:
   at least one first rotor assembly of a gas turbine engine compressor rotatable around a rotational axis, each first rotor assembly having a plurality of blades with each blade having a tip;
   at least one first stator assembly of said gas turbine engine compressor disposed adjacent said at least one first rotor assembly;
   at least one first shroud segment having blade seal surfaces disposed radially outside of said at least one first rotor assembly;
   at least one second rotor assembly of a gas turbine engine turbine rotatable around said rotational axis, each second rotor assembly having a plurality of blades with each blade having a tip;
   at least one second stator assembly of said gas turbine engine turbine disposed adjacent said at least one second rotor assembly;
   at least one second shroud segment having blade seal surfaces disposed radially outside of said at least one second rotor assembly, wherein said blade tips and said blade seal surfaces have mating geometries and a clearance distance extending between said blade tips and said blade seal surfaces;
   an actuator selectively operable to move said at least one first rotor assembly and said at least one second rotor assembly to alter said clearance distance; and
   means for controlling said actuator at a response rate sufficient to alter said clearance distance.

2. The zero running clearance system of claim 1, wherein said response rate comprises a rate slower than an operator input or an auto throttle system and faster than a maximum engine response time based upon a change in a gas turbine engine parameter.

3. The zero running clearance system of claim 2, wherein said gas turbine engine parameter comprises any one of the following: rotor speed and engine pressure.

4. The zero running clearance system of claim 1, wherein said response rate comprises a rate that is a function of an altitude of an aircraft relative to said clearance distance.

5. The zero running clearance system of claim 4, wherein said clearance distance is greater than an average clearance distance when said altitude is lower than an average altitude and said clearance distance is less than said average clearance distance when said altitude is greater than said average altitude.

6. The zero running clearance system of claim 1, wherein said response rate comprises a rate that is a function of a g-load imparted upon said gas turbine engine by an aircraft maneuver.

7. The zero running clearance system of claim 1, wherein said response rate comprises a rate that is a function of a temperature of said at least first rotor assembly, said at least one second rotor assembly, said at least one shroud segment and said at least one second shroud segment, wherein said temperature is less than or greater than a steady state temperature of said at least first rotor assembly, said at least one second rotor assembly, said at least one shroud segment and said at least one second shroud segment.

8. The zero running clearance system of claim 1, wherein said gas turbine engine compressor comprises a low pressure compressor and a high pressure compressor, and wherein said actuator is selectively operable to move at least one first rotor assembly within said high pressure compressor.

9. The zero running clearance system of claim 1, wherein said gas turbine engine turbine comprises a low pressure turbine and a high pressure turbine, and wherein said actuator is selectively operable to move at least one second rotor assembly within said high pressure turbine.

10. The zero running clearance system of claim 1, wherein said gas turbine engine compressor comprises a low pressure compressor and a high pressure compressor, and wherein said actuator is selectively operable to move at least one first rotor assembly within said low pressure compressor.

11. The zero running clearance system of claim 1, wherein said gas turbine engine turbine comprises a low pressure turbine and a high pressure turbine, and wherein said actuator is selectively operable to move at least one second rotor assembly within said low pressure turbine.

12. The zero running clearance system of claim 1, wherein said actuator is selectively operable to move in unison said at least one first rotor assembly and said at least one second rotor assembly.

13. The zero running clearance system of claim 1, further comprising at least one sensor for sensing said clearance distance.

14. The zero running clearance system of claim 1, wherein said at least one first stator assembly and said at least one second stator assembly are each cantilevered.

15. A method for controlling blade tip clearance within a gas turbine engine, comprising:
   providing a compressor having at least one first rotor assembly, each first rotor assembly having a plurality of blades with each blade having a blade tip, at least one first stator assembly disposed adjacent said at least one first rotor assembly, and a shroud having at least one blade seal surfaces disposed radially outside of said at least one first rotor assembly, wherein said blade tips in each of said at least one first rotor assembly has a mating geometry with at least one of said at least one blade seal surfaces, and a clearance distance extending between said blade tips and said blade seal surfaces;
   providing a turbine having at least one second rotor assembly, each second rotor assembly having a plurality of blades with each blade having a blade tip, at least one second stator assembly disposed adjacent said at least one second rotor assembly, and said shroud having at least one blade seal surfaces disposed radially outside of said at least one second rotor assembly, wherein said blade tips in each of said at least one second rotor assembly has a mating geometry with at least one of said at least one blade seal surfaces, and a clearance distance extending between said blade tips and said blade seal surfaces;

providing an actuator selectively operable to move said at least one rotor assembly relative to said shroud;

providing an electronic engine controller having a control logic for operating said actuator; and moving said at least one first rotor assemblies and at least one second rotor assembly relative to said shroud using said actuator at a response rate according to said control logic to alter said clearance distance.

16. The method of claim 15, wherein moving comprises moving said at least one first rotor assemblies and at least one second rotor assemblies at a response rate slower than an operator input or an auto throttle system and faster than a maximum engine response time based upon a change in a gas turbine engine parameter.

17. The method of claim 15, wherein moving comprises moving said at least one first rotor assembly and said at least one second rotor assembly at a response rate that is a function of an altitude of an aircraft relative to said clearance distance.

18. The method of claim 17, wherein said clearance distance is greater than an average clearance distance when said altitude is lower than an average altitude and said clearance distance is less than said average clearance distance when said altitude is greater than said average altitude.

19. The method of claim 15, wherein moving comprises moving said at least one first rotor assembly and said at least one second rotor assembly at a response rate that is a function of a g-load imparted upon said gas turbine engine by an aircraft maneuver.

20. The method of claim 15, wherein moving comprises moving said at least one first rotor assembly and said at least one second rotor assembly a response rate that is a function of a temperature of said at least first rotor assembly, said at least one second rotor assembly, said at least one shroud segment and said at least one second shroud segment, wherein said temperature is less than or greater than a steady state temperature of said at least first rotor assembly, said at least one second rotor assembly, said at least one shroud segment and said at least one second shroud segment.

21. The method of claim 15, further comprising the steps of:

providing a desired clearance distance extending between said blade tips and said blade seal surfaces according to said control logic;

sensing an actual clearance distance extending between said blade tips and said blade seal surfaces;

comparing said desired clearance distance to said sensed actual clearance distance to determine a difference value; and moving in unison said at least one first rotor assembly and said at least one second rotor assembly relative to said shroud using said actuator at a response rate according to said control logic and in a direction that decreases said difference value.

22. The method of claim 15, wherein moving comprises moving said at least one first rotor assembly and said at least one second rotor assembly in unison.

23. The method of claim 15, wherein said at least one first stator assembly and said at least one second stator assembly are each cantilevered.

* * * * *